United States Patent
Bindal et al.

(10) Patent No.: US 11,443,411 B2
(45) Date of Patent: Sep. 13, 2022

(54) METHOD AND SYSTEM FOR IMAGE DISTORTION CORRECTION USING QUARTER AND TANGENTIAL LOOKUP TABLES

(71) Applicant: NXP USA, Inc., Austin, TX (US)

(72) Inventors: Ankur Bindal, Ambala (IN); Michael Andreas Staudenmaier, Munich (DE); Sharath Subramanya Naidu, Munich (DE)

(73) Assignee: NXP USA, Inc., Austin, TX (US)

( * ) Notice: Subject to any disclaimer, the term of this patent is extended or adjusted under 35 U.S.C. 154(b) by 129 days.

(21) Appl. No.: 16/923,855

(22) Filed: Jul. 8, 2020

(65) Prior Publication Data

US 2022/0012854 A1 Jan. 13, 2022

(51) Int. Cl.
*G06T 5/00* (2006.01)
*H04N 5/91* (2006.01)
*H04N 5/232* (2006.01)
*G06T 1/60* (2006.01)

(52) U.S. Cl.
CPC .............. *G06T 5/006* (2013.01); *G06T 1/60* (2013.01); *H04N 5/23229* (2013.01); *H04N 5/91* (2013.01)

(58) Field of Classification Search
CPC ......... G06T 5/006; G06T 1/60; G06T 15/205; G06T 3/4007; H04N 5/23229; H04N 5/91; H04N 5/217; H04N 5/77
See application file for complete search history.

(56) References Cited

U.S. PATENT DOCUMENTS

| | | | |
|---|---|---|---|
| 6,924,825 B1* | 8/2005 | Bannai | G09G 5/10 345/76 |
| 9,536,287 B1 | 1/2017 | Eldar | |
| 9,633,419 B2 | 4/2017 | Baek et al. | |
| 10,152,776 B2 | 12/2018 | Langlois et al. | |
| 10,403,029 B2* | 9/2019 | Ozguner | G06T 15/205 |
| 10,909,668 B1* | 2/2021 | Naidu | G06T 5/006 |
| 11,270,416 B2* | 3/2022 | Subramanya Naidu | G06T 5/006 |
| 2014/0104376 A1* | 4/2014 | Chen | H04N 5/23238 348/36 |
| 2021/0012458 A1* | 1/2021 | Stec | G06T 3/4007 |
| 2021/0374919 A1 | 12/2021 | Bindal et al. | |

FOREIGN PATENT DOCUMENTS

| | | |
|---|---|---|
| CN | 105095896 A | 11/2015 |
| JP | 4906753 B2 | 3/2012 |

* cited by examiner

*Primary Examiner* — Hung H Lam

(57) ABSTRACT

A system and method for correcting image distortion is provided. The system and method remaps pixel position of distorted images using a combination of radial distortion correction and tangential distortion correction lookup tables consuming less physical memory. The solution conserves both memory and memory access bandwidth. The radial distortion correction lookup table is formed by taking advantage of radial distortion being generally symmetric about a determined optical center of the camera lens. This symmetry allows for use of a quarter LUT for correction in all quadrants of a distorted image. In addition, tangential distortion can be corrected in a symmetric manner that saves memory space as well.

20 Claims, 8 Drawing Sheets

METHOD AND SYSTEM FOR IMAGE DISTORTION CORRECTION USING QUARTER AND TANGENTIAL LOOKUP TABLES

BACKGROUND

Field

This disclosure relates generally to image processing systems, and more specifically, to a system and method for correcting geometric distortion in images using a reduced size lookup table.

Related Art

Geometric distortion is introduced by a camera sensor of an optical system while capturing an image and is usually caused due to curvature of a camera lens and magnification properties of the optical system at different fields-of-view points of the camera sensor. Introduction of geometric distortion while capturing the image leads to a distorted image such that straight lines of the subject captured by the camera sensor are curved in the distorted image whereas shapes of various objects in the distorted image appear different in varying field-of-view points of the camera sensor.

Geometric distortion includes radial and tangential distortion. Geometric distortion in a captured image is typically corrected by a remapping process utilizing a set of lookup tables (LUTs). In the remapping process, pixels in the distorted image are remapped to a new position for a corrected image. LUTs can be large because both x- and y-coordinates of each pixel in the distorted image may be stored in the set of LUTs. As an example, an 8-megapixel camera with an image resolution of 3840×2160 would require 3840×2160×2×4 bytes (64 MB) for complete distortion correction LUTs assuming 32-bit values for both x and y. The LUTs are generally stored in a memory external to the image processing circuit increasing significantly the amount of memory consumed. In addition, for applications running at a high frame rate, a high memory bandwidth is also utilized for reading information from the memory. It is desirable for a distortion correction solution that utilizes less memory and lower memory bandwidth.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a system and method for correcting image distortion. The system and method remaps pixel position of distorted images using a combination of radial distortion correction and tangential distortion correction lookup tables consuming less physical memory. The solution conserves both memory and memory access bandwidth. The radial distortion correction lookup table is formed by taking advantage of radial distortion being generally symmetric about a determined optical center of the camera lens. This symmetry allows for use of a quarter LUT for correction in all quadrants of a distorted image. In addition, tangential distortion can be corrected in a symmetric manner that saves memory space as well.

Geometric distortion is introduced by an optical system of a camera where lens curvature and magnification properties at differing field-of-view points can lead to straight lines being curved in an image and object shapes changing from one position on a sensor to another. For many applications, distortion may not be an issue. But in computer vision applications, having an object look different, depending upon the position of the camera sensor in which it appears, can present problems.

Figure 1:
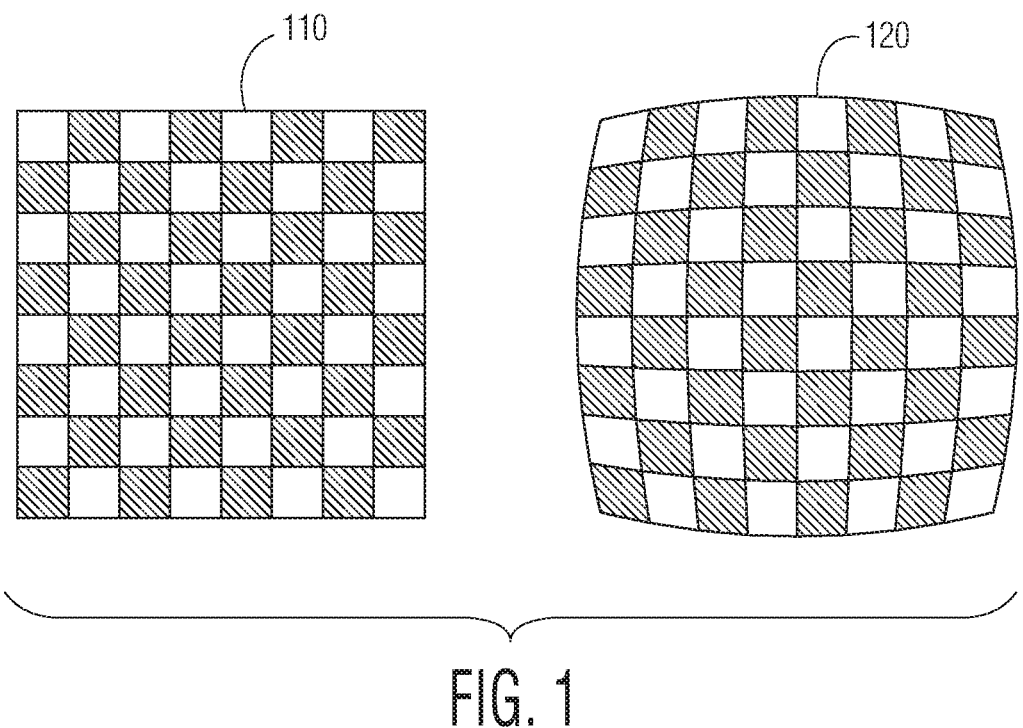
FIG. 1 is a simplified block diagram illustrating an example of a non-distorted image and a distorted image.

FIG. 1 is a simplified block diagram illustrating an example of a non-distorted image 110 and a distorted image 120. The form of distortion illustrated therein is a barrel-type distortion. Barrel distortion is commonly seen on wide-angle lenses, where the field-of-view is wider than the size of the image sensor. If the lens squeezes the light from the image to the image sensor, then barrel distortion is introduced. As a result, in this example, straight lines are visibly curved inwards, especially towards the extreme edges of the frame. Note that the lines appear straight near the center of the frame and start bending away from the center. This is due to the image being the same in the optical axis (e.g., the center of the lens), but the magnification decreasing toward the corners. While FIG. 1 illustrates an example of barrel distortion, it should be noted that embodiments of the present invention are not limited to correcting barrel distortion, but can also be used for other types of radially dominated distortion, such as, for example, pincushion distortion (i.e., straight lines curved outwards from the center) and so-called mustache distortion (i.e., a combination of barrel and pincushion distortions).

When distortion exceeds a visually-acceptable value, depending upon the camera field-of-view, the introduced distortion can be digitally corrected using a mapping process implemented in a dedicated logic block of a system-on-a-chip (SoC). The corrective mapping process involves picking each pixel in the correct image and mapping the pixel with a location in the distorted image. This calibration process for a particular lens/sensor combination can be performed by calibrating the camera to a known highly-structured pattern, such as the checkerboard in FIG. 1, and generating a LUT that maps each pixel in the desired corrected output image to a pixel position in the input distorted image. This can be performed using two LUTs, one for distorted x value (map_x) and one for distorted y value (map_y). Collectively, they give a pixel position in the distorted image for each pixel position in the corrected image. Or one LUT can be used for mapping both x and y values.

Figure 2:
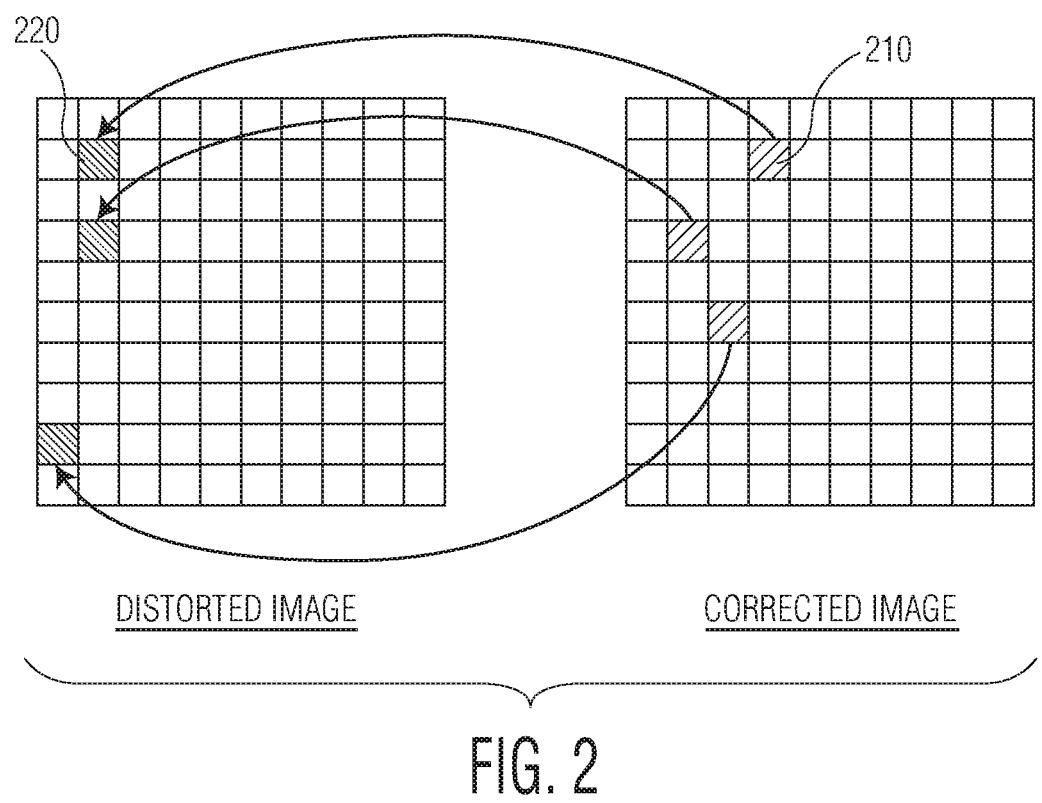
FIG. 2 is a simplified block diagram illustrating an example of correlating pixel positions in a corrected image with pixels in a non-corrected image.

FIG. 2 is a simplified block diagram illustrating an example of correlating pixel positions in a corrected image with pixels in a distorted image. For each pixel in the corrected image (e.g., pixel 210), the LUT stores x and y positions of a corresponding pixel or pixels in the distorted image (e.g., pixel 220). These can be stored separately (e.g., a LUT for x position and a LUT for y position) or clubbed (e.g., a single LUT storing both x and y values).

FIG. 2 illustrates a simplified mapping between corrected and distorted images. Generally, the correspondence between corrected and distorted images is more complex. Pixels from the corrected image do not necessarily lie on an integer pixel in the non-corrected image but might point to a position between pixels that then requires interpolation to obtain a correct value for the pixel. Thus, stored x and y positions may be fractional values that are stored in 32-bit floating point or 16/32-bit fixed point representation. For 32-bit values for both x and y, this translates to tens of megabytes of storage need for distortion correction. As discussed above, an 8-megapixel camera with image resolution of 3840×2160 would require about 64 MB of storage for a complete image distortion correction LUT assuming 32-bit values for both x and y.

LUT values are typically generated using a model of distortion that describes two major contributors to distortion: radial distortion and tangential distortion.

Radial Distortion. The most significant component of geometric distortion is radial distortion. Radial distortion mainly happens due to curvature of lens and the difference in magnification at different points of the sensor. It is governed by the following formulas that are radially symmetric—

$$x_d = x_u(1 + k_1 \cdot r^2 + k_2 \cdot r^4 + \ldots)$$

$$y_d = y_u(1 + k_1 \cdot r^2 + k_2 \cdot r^4 + \ldots) \quad (1)$$

Here k1 and k2 are the radial distortion coefficients which are calculated through calibration, $x_d$, $y_d$ and $x_u$, $y_u$ are the distorted and undistorted pixel positions respectively with respect to an optical center (Cx,Cy) of the camera lens, while radius $r = \sqrt{x_u^2 + y_u^2}$ We can rewrite the above formulas in terms of radius alone as well—

$$r_d = r_u(1 + k_1 \cdot r_u^2 + k_2 \cdot r_u^4 + \ldots) \quad (2)$$

This can be interpreted as pixels at one radius getting moved to a different radius due to distortion.

Tangential Distortion. This is the other type of distortion and is less dominant than radial distortion. Tangential distortion is primarily caused due to camera sensor not being in the same plane as the camera lens.

Figure 3:
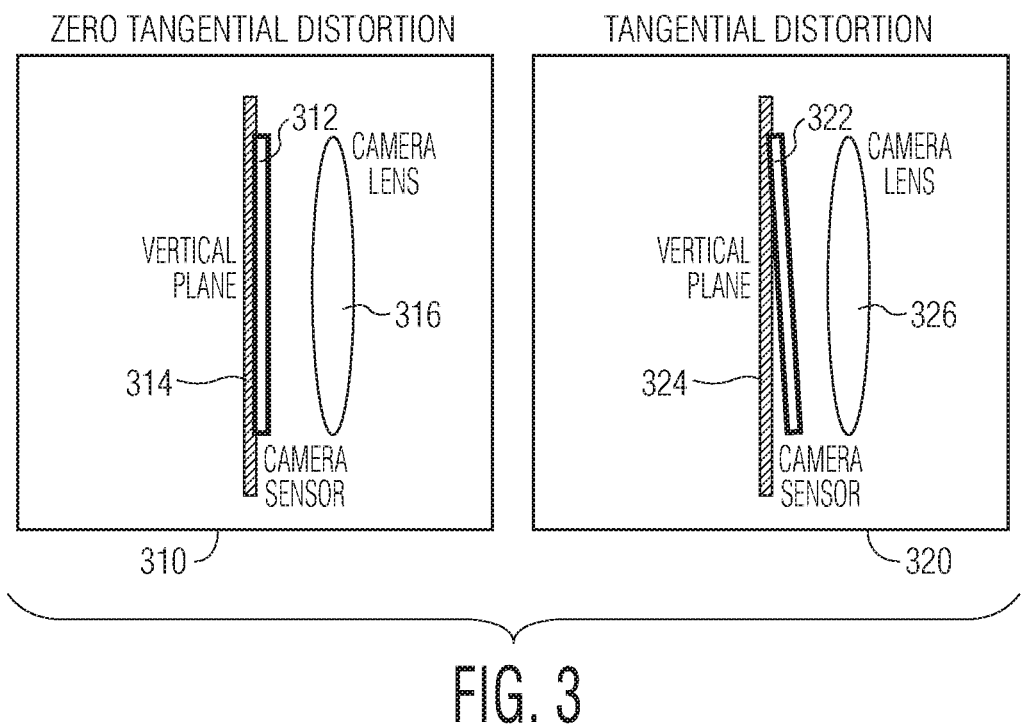
FIG. 3 is a simplified block diagram illustrating an example of how camera sensor/lens positions can generate tangential distortion.

FIG. 3 is a simplified block diagram illustrating an example of camera sensor/lens positions that generate no tangential distortion (310) and that generate tangential distortion (320). In the example where there is no tangential distortion, camera sensor 312 is in a vertical plane 314 that is parallel to the vertical plane of camera lens 316. In the example providing tangential distortion, camera sensor 322 is not in a vertical plane 324 that is parallel to the vertical plane of camera lens 326.

Tangential distortion is governed by the following formulas. The formulas illustrate that tangential distortion is more dependent on x/y position of a pixel with respect to optical center.

$$x_d = x_u + (2p_1 x_u y_u + p_2(r^2 + 2x_u^2))$$

$$y_d = y_u + (p_1(r^2 + 2y_u^2) + 2p_2 x_u y_u) \quad (3)$$

Here $p_1$ and $p_2$ are tangential distortion coefficients of the lens/sensor combination, $x_d$, $y_d$ and $x_u$, $y_u$ are the distorted and undistorted pixel positions respectively with respect to the optical center (Cx,Cy) of the camera lens and $r = \sqrt{x_u^2 + y_u^2}$. Tangential distortion is usually not so dominant since coefficient values are normally very small.

As discussed above, radial distortion is radially symmetric, which means that all the pixels at one non-distorted radius ($r_u$) are transposed to another radius ($r_d$) in a distorted image. On the other hand, the tangential distortion is more dependent upon the x/y position of the pixel (e.g., $x_d$ is more dependent upon $x_u$ due to the $x_u^2$ term, while $y_d$ is more dependent upon $y_u$ due to the $y_u^2$ term). These relationships can be exploited to reduce the memory requirement of a distortion correction system without compromising on the quality of the resulting corrected image.

Embodiments divide a traditional x/y coordinate lookup table (LUT) into four quarters and then generate an averaged "quarter LUT" and a set of tangential LUTs. These LUTs are smaller in size compared to the original LUT and can be used to reconstruct the complete original LUT, or a portion thereof, for distortion correction.

As stated above, corrective mapping/distortion correction can be performed using two LUTs: one for distorted x-coordinates (map_x) and one for distorted y-coordinates (map_y). Collectively, they give a pixel position in the distorted image for each pixel position in the corrected image. Mathematically, this means that for each pixel (x,y) in a corrected image, the LUTs will return (x0,y0) coordinates in a corresponding distorted image (e.g., LUT(x,y)→x0,y0). The mapping from an integer index (x,y) in the corrected image is likely to a fractional index (x0,y0) in the distorted image and so an interpolation is performed to obtain the correct value of the pixel to be placed at the (x,y) position in the corrected image. The operation is performed for each pixel to reconstruct the distortion corrected output image.

As discussed above, radial distortion is symmetric around an optical center (e.g., ideally a point of no distortion). Based on this symmetry, a LUT can be divided into four quadrants around the optical center and four equidistant points from the optical center in each quadrant would be distorted by the same amount. But tangential distortion results in a displacement that is not necessarily completely symmetric.

Figure 4:
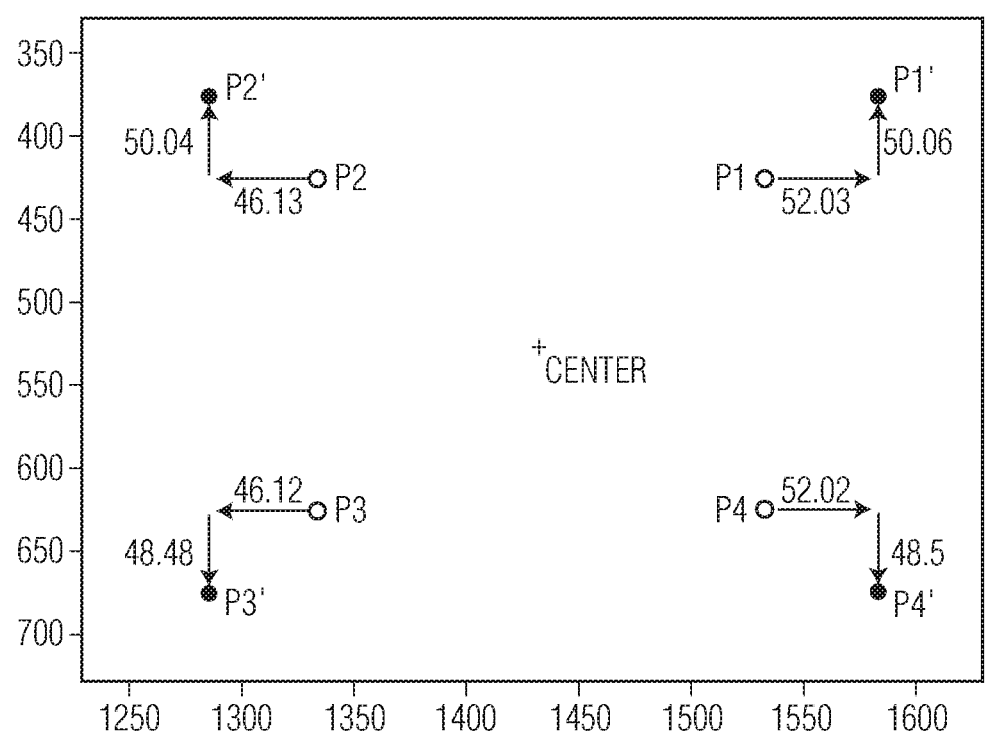
FIG. 4 is a simplified block diagram illustrating pixel displacement in an example of image distortion.
Figure 5:
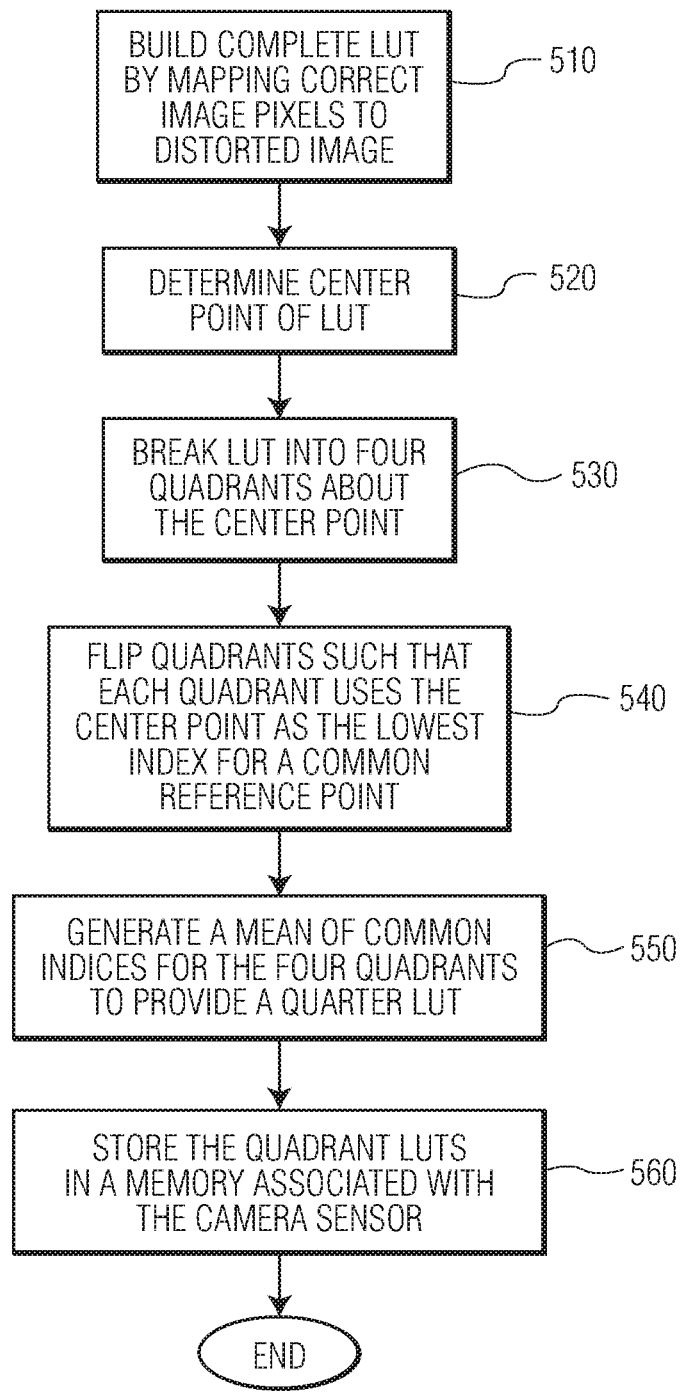
FIG. 5 is a simplified flow diagram illustrating an example process used to build a quarter lookup table usable by some embodiments of the present invention to construct corrected images from a distorted image.

FIG. 4 is a simplified block diagram illustrating pixel displacement in an example of image distortion. FIG. 5 is a simplified flow diagram illustrating an example process used to build a quarter lookup table usable by some embodiments of the present invention to construct corrected images from a distorted image. FIGS. 4 and 5 will be referred to in the discussion below.

FIG. 4 illustrates points P1, P2, P3, and P4 from the corrected image and their displacement from points P1', P2', P3', and P4' in a corresponding distorted image using example map_x and map_y data. While displacement of the pixels is comparable, the displacement is not exactly the same due to differences in the tangential distortion component. A full lookup table is generated from the map_x and map_y data correlating each pixel in the corrected image to the distorted image (510). Calibration, including lookup table construction, is performed by a manufacturer of a device or an original equipment manufacturer (OEM) subsequent to building the camera sensor with lens. As discussed above, the calibration uses a known highly structured image, such as a checkerboard pattern, to generate the distorted image from the camera sensor with lens. Calibration can be performed for each manufactured device or can be performed for a standard device in a set of devices, where all devices in the set are assumed to have the same or nearly the same distortion. Once performed, the lookup tables for radial and tangential distortion are stored in a memory associated with the camera sensor.

Embodiments of the present invention provide for reducing the full LUT table in size by dividing the image space into four quadrants around the optical center. Due to the differences associated with tangential distortion, a mean of the differences between the reconstructed LUT from the QLUT values for the pixels is taken along the x- or y-axis or along a complete column or row (e.g., the values illustrated in FIG. 4) and then tangential distortion is corrected for separately.

FIGS. 6A-6D illustrate an example of the method for dividing up a full LUT to generate a quarter LUT, in accord with example embodiments of the present invention.

In order to take the mean, a center point (Cx,Cy) is determined (520). The center point will not necessarily be the optical center of the image, but instead is a point at which the net difference between the reconstructed LUT and the original LUT is minimized. In one embodiment, an offline script is executed that iteratively examines several centers and a center with a minimal error between the original LUTs and the final reconstructed LUTs is chosen. Typically, the center will be in a neighborhood of the optical center (e.g., a 15×15 square around the optical center). Differences for each pixel in the neighborhood can be examined and a center point is chosen that minimizes the differences. Thus, the four quadrants may or may not be of the same dimensions. Center point (Cx,Cy) 615 is illustrated in LUT 610 of FIG. 6A.

Figure 6A:
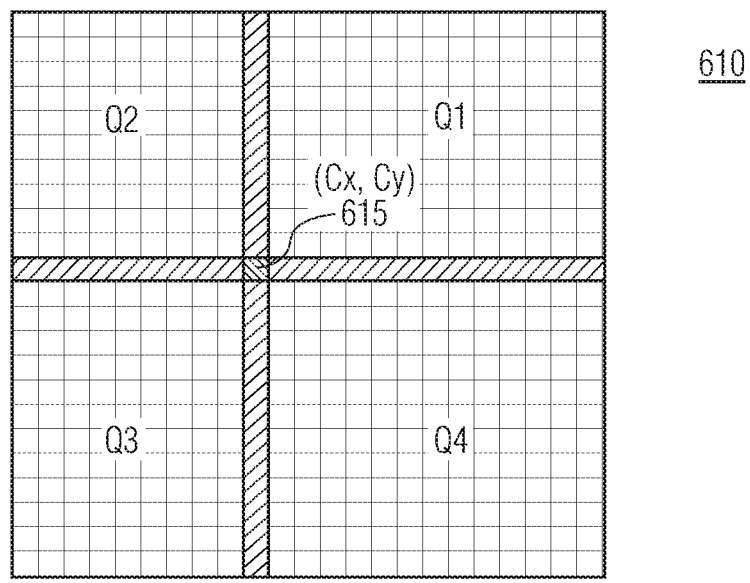
FIGS. 6A-6D illustrate an example of the method for dividing up a full LUT to generate a quarter LUT, in accord with example embodiments of the present invention.
Figure 6B:
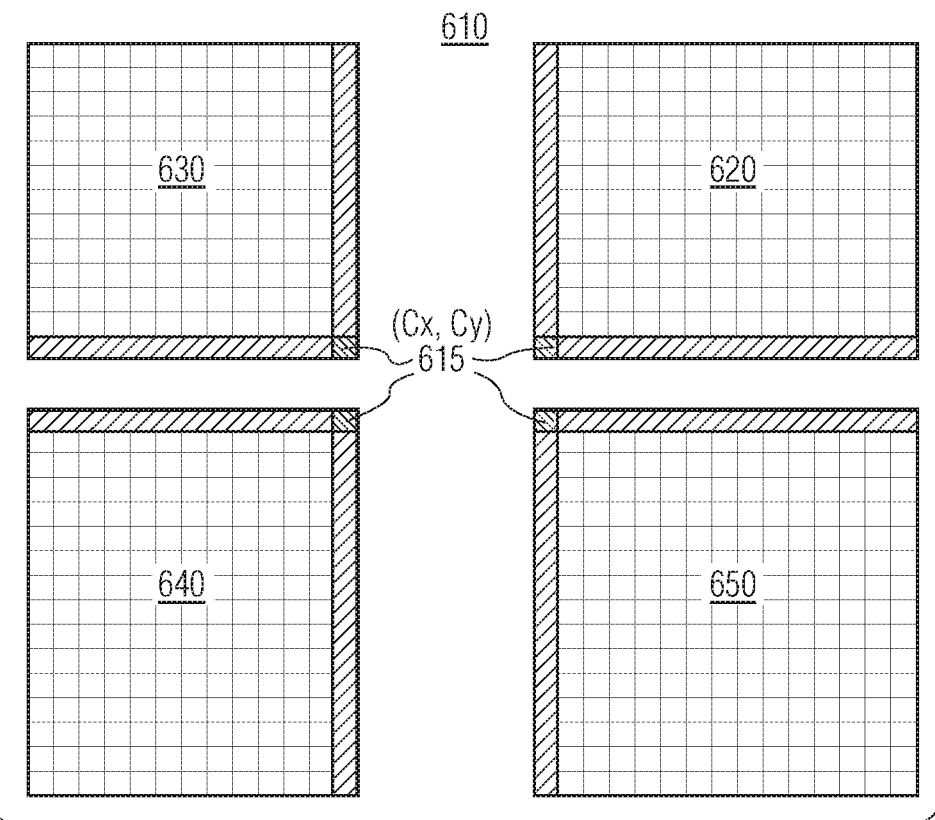

The LUT is broken into four quadrants about the center point 615 (530). FIG. 6B illustrates the formation of four quadrants 620, 630, 640 and 650 of the LUT 610.

Figure 6C:
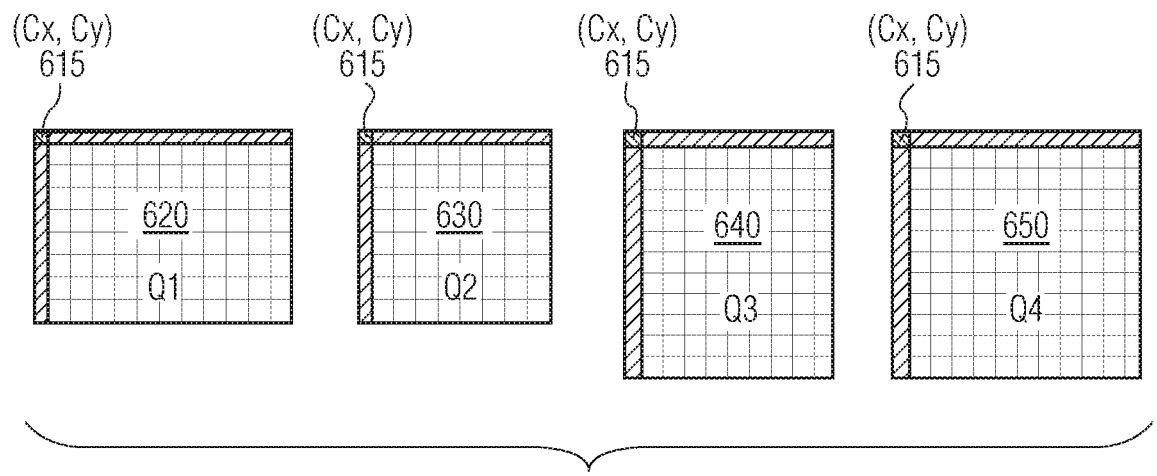

The quadrants are then flipped such that each quadrant uses the center point as the lowest index, thereby arriving at a common reference point in each quadrant (e.g., center (Cx,Cy) (540). To perform this, the map_x and map_y values are converted relative to the center point by taking an absolute difference of map_x with regard to Cx and map_y with regard to Cy. The four quadrants are then flipped to a common orientation such that the common reference point (Cx,Cy) is the first index of all separate quadrants. FIG. 6C illustrates the flipped quadrants 620, 630, 640, and 650.

Figure 6D:
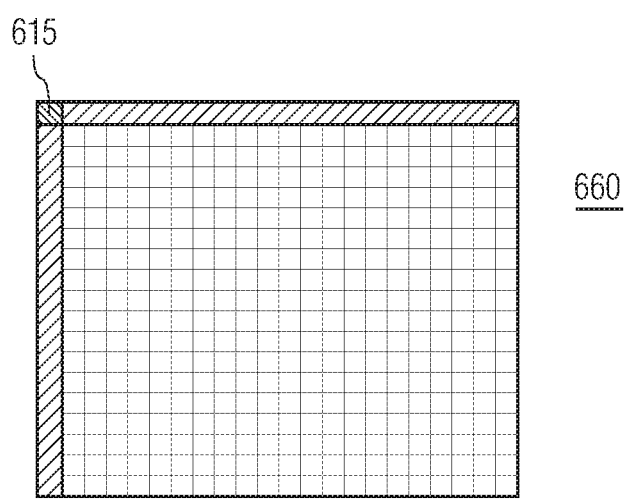

Once flipped, a mean of the four separate quadrants is taken to generate a quarter LUT (QLUT) (550). The mean of the four quadrants is illustrated in FIG. 6D as QLUT 660.

The size of QLUT 660 is a maximum x/y dimension of the four quadrants and is indexed with respect to (Cx,Cy). Two quarter LUTs result, one for x values (q_x) and one for y values (q_y). The QLUTs are stored in a memory associated with the camera sensor being calibrated (560).

During reconstruction of a corrected image from a distorted image, a full LUT value at any pixel position can be calculated based on the quadrant the pixel lies in and using a corresponding quadrant formula:

Quadrant 620:

$$map\_x[i,j]=q\_x[Cy-i,j-Cx]+Cx$$

$$map\_y[i,j]=Cy-q\_y[Cy-i,j-Cx]$$

Quadrant 630:

$$map\_x[i,j]=Cx-q\_x[Cy-i,Cx-j]$$

$$map\_y[i,j]=Cy-q\_y[Cy-i,Cx-j]$$

Quadrant 640:

$$map\_x[i,j]=Cx-q\_x[i-Cy,Cx-j]$$

$$map\_y[i,j]=q\_y[i-Cy,Cx-j]+Cy$$

Quadrant 650:

$$map\_x[i,j]=q\_x[i-Cy,j-Cx]+Cx$$

$$map\_y[i,j]=q\_y[i-Cy,j-Cx]+Cy$$

Figure 7A:
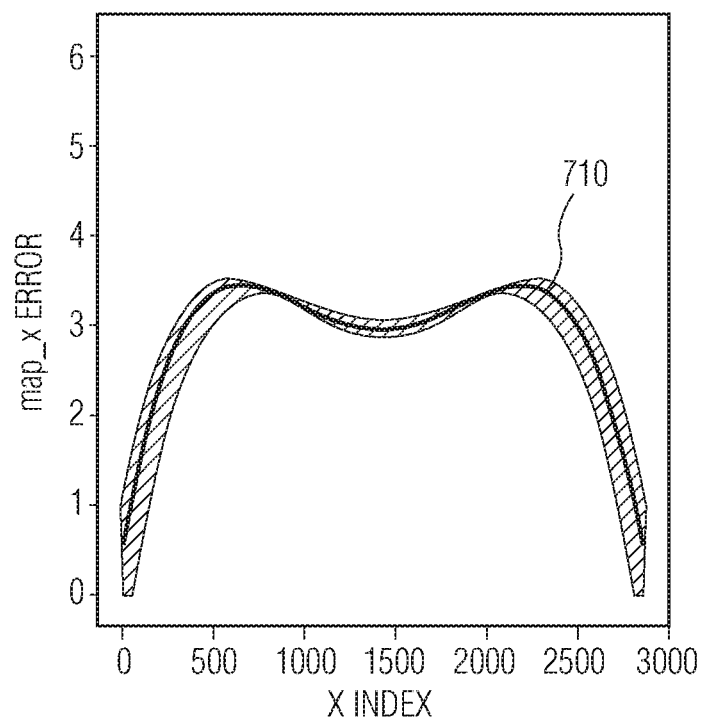
FIGS. 7A and 7B are charts illustrating an example of deviation from original LUT values, where the denser color means more pixels are in that proximity.
Figure 7B:
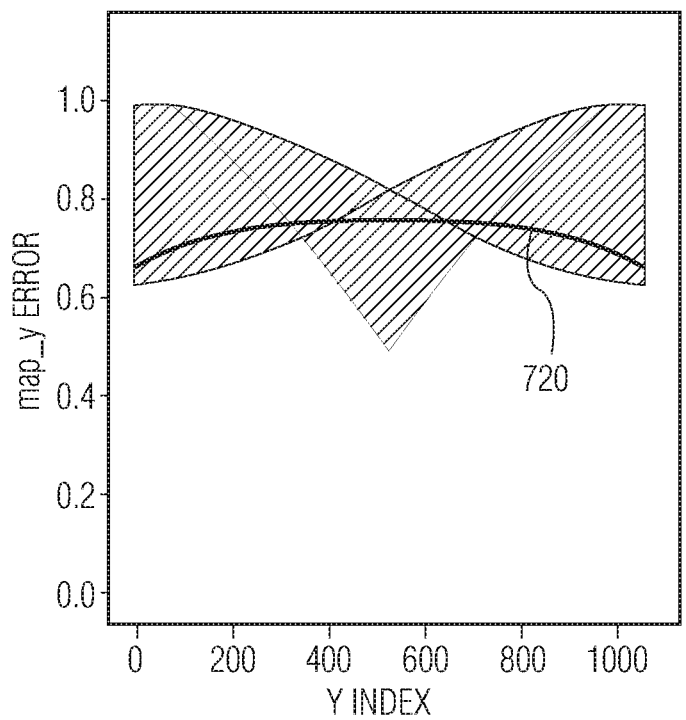

Once the reconstruction of the LUT is performed from the QLUT, there remain errors in map_x and map_y along the x- and y-axis, respectively, due to the tangential distortion in x and y. FIGS. 7A and 7B are charts illustrating an example of deviation from original LUT values, where the denser color means more pixels are in that proximity. As illustrated, in FIG. 7A, the map_x error is close for all y-points at a single x value (e.g., all rows at one column have a similar error in map_x). Similarly, FIG. 7B illustrates that the map_y error is close for all x-points at a single y value (e.g., all columns at one row have a similar error in map_y). This correlates with the tangential distortion equations above (equation 3), which shows tangential distortion is dependent upon the x/y position of the pixel. FIG. 4 also illustrates that point pairs (P1,P2) and (P3,P4) have nearly the same y-displacement values and point pairs (P1,P4) and (P2,P3) have nearly the same x-displacement values.

An approximate tangential distortion LUT in x and y can be generated, for example, by taking a mean of the error at each x, for map_x, and each y, for map_y. Dark lines 710 and 720 in FIGS. 7A and 7B, respectively, illustrate a mean of the errors for the x and y values. The mean values can be used to generate two new LUTs, one for correcting tangential distortion in x and one for correcting tangential distortion in y. Due to the simplified nature of the data represented in these LUTs, the size will be the number of pixels in the x or y axis multiplied by a number of bytes to store the error value. For example, for a 3840×2160 image, the tangential distortion correction LUT for the x direction (TxLUT) would be about 15 kB for 32 bit per pixel values (i.e., 3840×32/8), and about 9 kB (i.e., 2160×32/8) for the tangential distortion correction LUT for the y direction (TyLUT). Once the QLUT(s) and the tangential distortion LUTs have been built offline, population of a corrected image from the camera can be performed in hardware.

Figure 8:
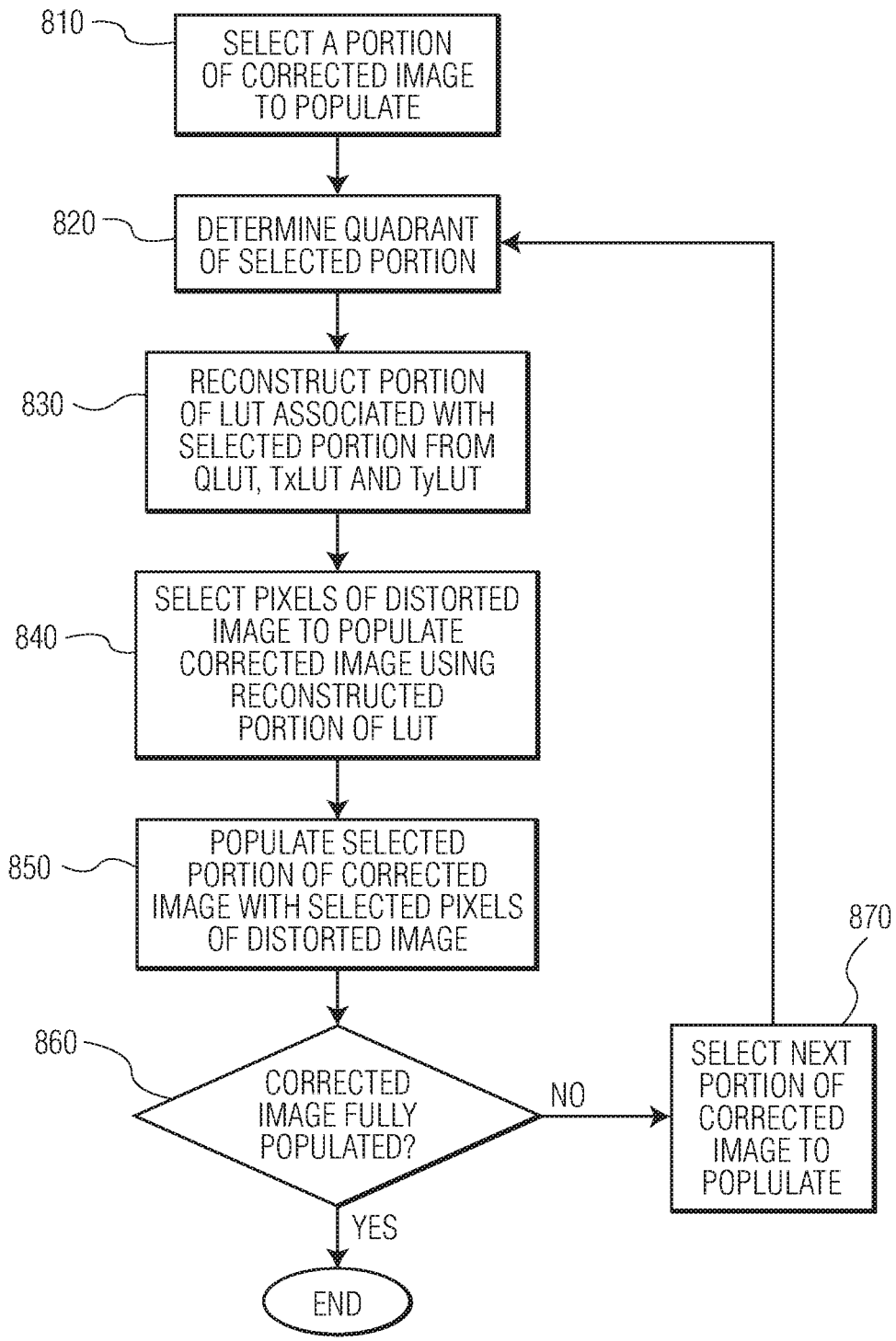
FIG. 8 is a simplified flow diagram illustrating an example of a process for populating a corrected image from a distorted image using embodiments of the present invention.

FIG. 8 is a simplified flow diagram illustrating an example of a process to generate a set of corrected image portions from a set of distorted image portions using embodiments of the present invention. As an initial step, a portion of the corrected image is selected for populating by an image processing circuit (810). In order to conserve the amount of memory needed for temporarily storing the reconstructed LUT and the bandwidth to read information from the QLUT and the TxLUT and TyLUT, a portion of the corrected image is chosen for population at a time. Once the portion is selected, the image processing circuit determines the quadrant of the corrected image in which the selected portion resides (820). Using the quadrant and selected portion information, a corresponding portion of the LUT is reconstructed from the QLUTs (x and y), and the TxLUT and TyLUT. The formulas presented above with regard to quadrants 620, 630, 640 and 650 to reconstruct the LUT from the QLUTs can be used to perform the reconstruction along with the tangential LUT information (for example, for quadrant 620, the equations are: map_x[i,j]=q_x[Cy−i, j−Cx]+Cx+TxLUT, and map_y[i,j]=Cy−q_y[Cy−i,j−Cx]+TyLUT[i]).

Once the corresponding portion of the LUT is reconstructed, the image processing circuit can select pixels from the distorted image to populate the corrected image using the reconstructed LUT (840) and then the portion of the corrected image is populated with that pixel information (850).

In one embodiment, selection of the pixels from the distorted image is facilitated by a predetermined correlation between portions of a corrected image space with portions of a distorted image space. For example, if the complete corrected image is divided into 64×64 blocks, the correspondence of each of those in the corrected image space with rectangular regions in the distorted image space can be predetermined and stored by the hardware. This information can be used to fetch the needed portion of the distorted image for each of the 64×64 blocks, rather than making a pixel-by-pixel correspondence, which can take significant processing time. This correspondence can be characterized by designating each of the four corners of the portion of the distorted image or a designating a corner plus dimensions of the region.

Some or all of the pixels from the distorted portion are used for reconstruction of the corrected image. If the corrected image is then fully populated (860), then the process ends. If the corrected image is not fully populated, then a next, unpopulated portion of the corrected image can be selected for population (870) and the process repeats for that selected portion.

Figure 9:
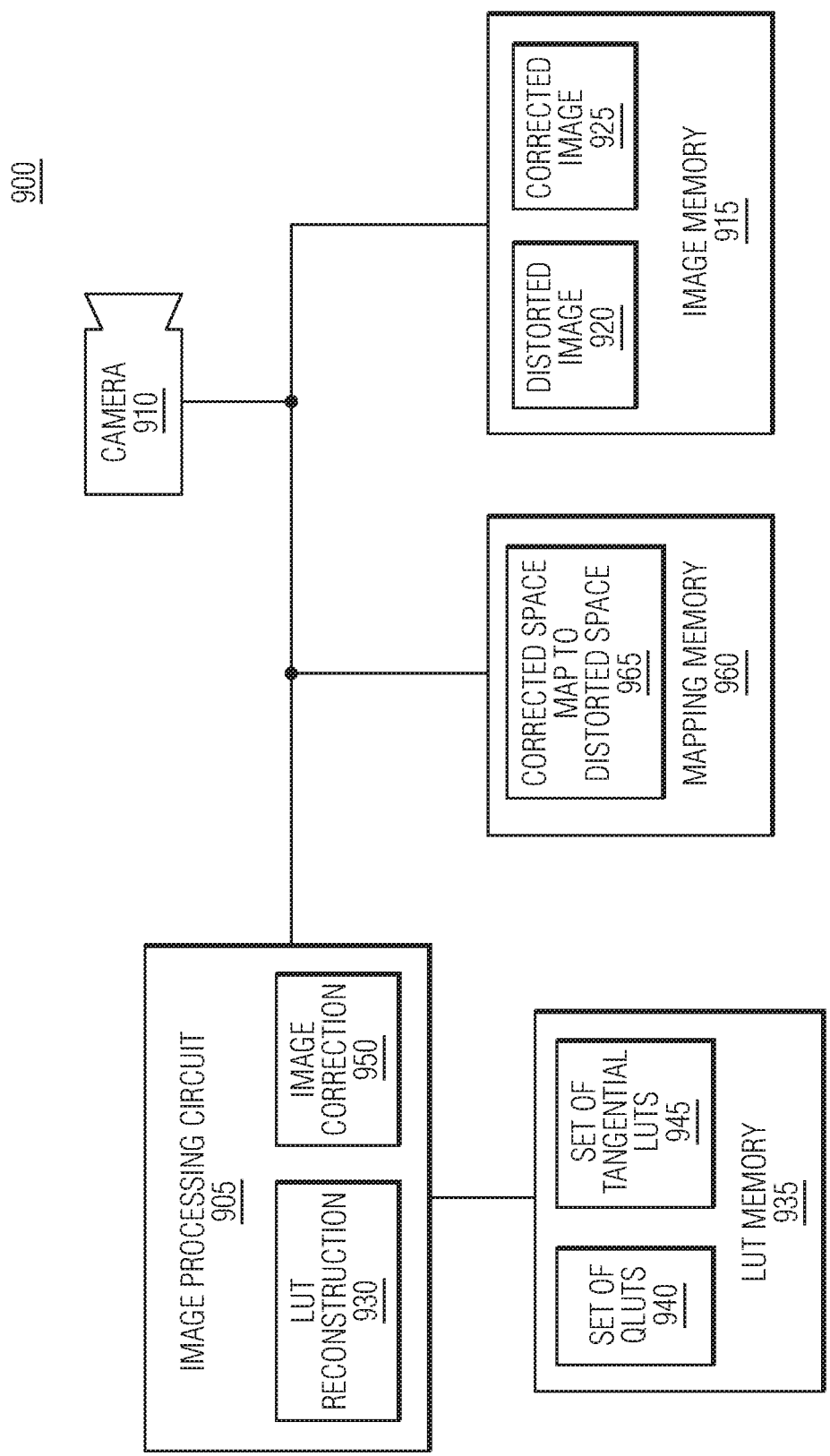
FIG. 9 is a simplified block diagram illustrating a system-on-a-chip (SoC) 900 that includes an image processing circuit configured to implement embodiments of the present invention.

FIG. 9 is a simplified block diagram illustrating a system 900 that includes an image processing circuit configured to implement embodiments of the present invention. The SoC includes an image memory 915 that stores a distorted image 920 generated by a camera 910. As discussed above, image processing circuit 905 begins to construct the corrected image by selecting a portion of the corrected image to populate. A LUT reconstruction logic 930 accesses a LUT memory 935 that stores a set of QLUTs 940 and a set of tangential distortion LUTs 945 to reconstruct a portion of the LUT needed to populate the selected portion of the corrected image. LUT memory can be an internal memory located inside an SoC or memory external to the SoC (e.g., DDR memory). LUT reconstruction logic 930 only accesses the portion of the QLUTs and the tangential distortion LUTs associated with the selection portion of the corrected image and forms the portion of the reconstructed LUT using, for example, the process and formulas discussed above. Once the portion of the reconstructed LUT is generated by image processing circuit 905, an image correction logic 950 of the image processing circuit accesses the portions of distorted image 920 associated with the portion of the reconstructed LUT and performs the remapping and interpolation to populate the selected portion of corrected image 925. As discussed above with regard to the process in FIG. 8, this continues until the corrected image is entirely populated.

As discussed above, in one embodiment, a correspondence of regions of the corrected image space with rectangular regions in the distorted image space can be predetermined and stored by the hardware. A mapping memory 960 is included in SoC 900 to store this corrected image space mapping to the distorted image space 965. The mapping is calculated prior to use of SoC 900. By using the mapping to access portions of the distorted image that correspond to the selected portions of the corrected image, population of the corrected image is accelerated.

Embodiments of the present invention provide for reduced memory space in storing the set of QLUTs, which are significantly smaller than a full LUT. Further, embodiments result in lower used data bandwidth between LUT memory 935 and image processing circuit 905 due to the smaller size of the QLUTs. Further, by reconstructing only a portion of the LUT needed for a selected portion of the corrected image, the amount of data needed to be transferred for performing a correction of a portion of the distorted image is also reduced. These advantages allow for faster performance and less area needed for the LUT memory.

By now it should be appreciated that there has been provided a method for populating a corrected image from a distorted image by an image processing the circuit. The method includes selecting a portion of the corrected image to populate, determining a quadrant of the corrected image in which the selected portion resides, reconstructing a portion of a lookup table corresponding to the selected portion of the corrected image, populating the selected portion of the corrected image with pixels selected from the distorted image using the generated portion of the LUT, and selecting a next portion of the corrected image to populate when the corrected image is not fully populated. The LUT correlates pixels in the selected portion of the corrected image with one or more pixels of the distorted image. The reconstructing is performed using a quarter LUT (QLUT), an x-axis tangential distortion LUT (TxLUT), a y-axis tangential distortion LUT (TyLUT), and the determined quadrant of the corrected image.

In one aspect of the above embodiment, the QLUT is stored in a memory coupled to the image processing circuit. In another aspect, the QLUT includes a set of values generated from a mean of corresponding values from four quadrants of an original LUT formed around a center point (Cx,Cy) that are flipped such that each quadrant uses the center point as a lowest index. In a further aspect, the QLUT includes an x-axis QLUT (q_x) and a y-axis QLUT (q_y). In another further aspect, the original LUT includes values generated during a calibration that correlates pixels from a corrected calibration image to pixels from a distorted calibration image. In yet another further aspect, the TxLUT includes a mean of the errors between the original LUT and a reconstructed LUT generated from the QLUT at each x-coordinate. In still another further aspect, the TyLUT includes a mean of the errors between the original LUT and a reconstructed LUT generated from the QLUT at each y-coordinate. In yet another further aspect, the QLUT is one quarter the memory size of the original LUT. In another aspect of the above embodiment, the method further includes selecting a portion of the distorted image corresponding to the selected portion of the corrected image using a predetermined mapping between one or more portions of a corrected image space with corresponding portions of a distorted image space, and using the selected portion of the distorted image for selecting the pixels from the distorted image in populating the selected portion of the corrected image.

Another embodiment provides an image processing system configured to generate a corrected image from a distorted image. The image processing system includes: an image memory storing a distorted image and configured to store a corrected image; a lookup table memory storing a QLUT, a TxLUT, and a TyLUT; and an image processing circuit coupled to the image memory and the lookup table memory. The image processing circuit is configured to select a portion of the corrected image to populate, determine a quadrant of the corrected image in which the selected portion resides, generate a portion of a LUT corresponding to the selected portion of the corrected image using the QLUT, TxLUT, TyLUT, and the determined quadrant where the generated LUT correlates pixels in the selected portion of the corrected image with one or more pixels of the distorted image, populate the selected portion of the corrected image with pixels selected from the distorted image using the generated portion of the LUT, and select a next portion of the corrected image to populate when the corrected image is not fully populated.

In one aspect of the above embodiment, the QLUT includes a set of values generated from a mean of corresponding values from four quadrants of an original LUT formed around a center point that are flipped such that each quadrant uses the center point as a lowest index. In a further aspect, the QLUT is stored in the lookup table memory as an x-axis QLUT and a y-axis QLUT. In another further aspect, the original LUT includes values generated during a calibration the correlates pixels from a corrected calibration image to pixels from a distorted calibration image. In still another further aspect, the TxLUT includes a mean of the errors between the original LUT and a reconstructed LUT generated from the QLUT at each x-coordinate. In another further aspect, the TyLUT includes a mean of the errors between the original LUT and a reconstructed LUT generated from the QLUT at each y-coordinate. In another aspect of the above embodiment, the system further includes a camera sensor coupled to the image memory and configured to scan an image and store the image in the image memory as the distorted image.

In another aspect of the above embodiment, the system further includes a mapping memory that is coupled to the image processing circuit. The mapping memory stores a predetermined mapping between one or more portions of a corrected image space with corresponding portions of a distorted image space. The image processing circuit is further configured to select a portion of the distorted image corresponding to the selected portion of the corrected image using the predetermined mapping stored in the mapping memory.

In another embodiment, a method is provided for generating a QLUT from an original lookup table of values correlating a corrected calibration image to pixels from a distorted calibration image. The method includes: determining a center point of the original LUT; breaking the original LUT into four quadrants around the center point; flipping the four quadrants such that each quadrant uses the center point as a lowest index; generating a mean value of values at common index value for the four quadrants; and, storing the mean value at the index value of the QLUT in a memory of an image processing system.

In one aspect, the method further includes generating the original LUT by mapping each corrected calibration image pixel to a corresponding pixel of the distorted calibration image. In another aspect, determining the center point of the original LUT includes determining a point of least error for radial and tangential distortion in the original LUT. In yet another aspect, the method further includes performing the method during a calibration of the image processing system where the image processing system includes a camera having an image sensor and a lens.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 9 and the discussion thereof describe an exemplary image processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 900 are circuitry located on a single integrated circuit or within a same device. Alternatively, system 900 may include any number of separate integrated circuits or separate devices interconnected with each other. For example, memory 915 or 935 may be located on a same integrated circuit as image processing circuit 905 or on a separate integrated circuit or located within another peripheral or slave discretely separate from other elements of system 900. Camera 910 may also be located on separate integrated circuits or devices. Also for example, system 900 or portions thereof may be soft or code representations of physical circuitry or of logical representations convertible into physical circuitry. As such, system 900 may be embodied in a hardware description language of any appropriate type.

Furthermore, those skilled in the art will recognize that boundaries between the functionality of the above described operations merely illustrative. The functionality of multiple operations may be combined into a single operation or the functionality of a single operation may be distributed in additional operations. Moreover, alternative embodiments may include multiple instances of a particular operation, and the order of operations may be altered in various other embodiments.

All or some of the software described herein may be received elements of system 900, for example, from computer readable media such as memory 935 or other media on other computer systems. Such computer readable media may be permanently, removably or remotely coupled to an information processing system such as system 900. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for populating a corrected image from a distorted image by an image processing circuit, the method comprising:
   selecting a portion of the corrected image to populate;
   determining a quadrant of the corrected image in which the selected portion resides;
   reconstructing a portion of a lookup table (LUT) corresponding to the selected portion of the corrected image, wherein
      the LUT correlates pixels in the selected portion of the corrected image with one or more pixels of the distorted image,
      said reconstructing is performed using a quarter LUT (QLUT), an x-axis tangential distortion LUT (TxLUT), a y-axis tangential distortion LUT (TyLUT), and the determined quadrant of the corrected image;
   populating the selected portion of the corrected image with pixels selected from the distorted image using the generated portion of the LUT; and
   selecting a next portion of the corrected image to populate when the corrected image is not fully populated.

2. The method of claim 1 wherein the QLUT is stored in a memory coupled to the image processing circuit.

3. The method of claim 1 wherein the QLUT comprises:
   a set of values generated from a mean of corresponding values from four quadrants of an original LUT formed around a center point (Cx,Cy) that are flipped such that each quadrant uses the center point as a lowest index.

4. The method of claim 3 wherein the QLUT comprises an x-axis QLUT (q_x) and a y-axis QLUT (q_y).

5. The method of claim 3 wherein the original LUT comprises values generated during a calibration that correlates pixels from a corrected calibration image to pixels from a distorted calibration image.

6. The method of claim 3 wherein the TxLUT comprises a mean of the errors between the original LUT and a reconstructed LUT generated from the QLUT at each x coordinate.

7. The method of claim 3 wherein the TyLUT comprises a mean of the errors between the original LUT and a reconstructed LUT generated from the QLUT at each y coordinate.

8. The method of claim 1 further comprising:
   selecting a portion of the distorted image corresponding to the selected portion of the corrected image using a predetermined mapping between one or more portions of a corrected image space with corresponding portions of a distorted image space; and
   using the selected portion of the distorted image for selecting the pixels from the distorted image in populating the selected portion of the corrected image.

9. An image processing system configured to generate a corrected image from a distorted image, the image processing system comprising:
   an image memory storing a distorted image and configured to store a corrected image;
   a lookup table memory storing a quarter LUT (QLUT), an x-axis tangential distortion LUT (TxLUT), and a y-axis tangential distortion LUT (TyLUT);
   an image processing circuit, coupled to the image memory and the lookup table memory, and configured to
      select a portion of the corrected image to populate,
      determine a quadrant of the corrected image in which the selected portion resides,
      generate a portion of a LUT corresponding to the selected portion of the corrected image using the QLUT, TxLUT, TyLUT, and the determined quadrant, wherein the generated LUT correlates pixels in the selected portion of the corrected image with one or more pixels of the distorted image,
      populate the selected portion of the corrected image with pixels selected from the distorted image using the generated portion of the LUT, and
      select a next portion of the corrected image to populate when the corrected image is not fully populated.

10. The system of claim 9 wherein the QLUT comprises:
   a set of values generated from a mean of corresponding values from four quadrants of an original LUT formed around a center point (Cx,Cy) that are flipped such that each quadrant uses the center point as a lowest index.

11. The system of claim 10 wherein the QLUT is stored in the lookup table memory as an x-axis QLUT (q_x) and a y-axis QLUT (q_y).

12. The system of claim 10 wherein the original LUT comprises values generated during a calibration that correlates pixels from a corrected calibration image to pixels from a distorted calibration image.

13. The system of claim 10 wherein the TxLUT comprises a mean of the errors between the original LUT and a reconstructed LUT generated from the QLUT at each x coordinate.

14. The system of claim 10 wherein the TyLUT comprises a mean of the errors between the original LUT and a reconstructed LUT generated from the QLUT at each y coordinate.

15. The system of claim 9 further comprising:
a camera sensor coupled to the image memory and configured to
scan an image, and
store the image in the image memory as the distorted image.

16. The system of claim 9 further comprising:
mapping memory, coupled to the image processing circuit, and storing a predetermined mapping between one or more portions of a corrected image space with corresponding portions of a distorted image space; and
the image processing circuit is further configured to
select a portion of the distorted image corresponding to the selected portion of the corrected image using the predetermined mapping stored in the mapping memory.

17. A method for generating a quarter lookup table (QLUT) from an original lookup table (original LUT) of values correlating a corrected calibration image to pixels from a distorted calibration image, the method comprising:
determining a center point (Cx,Cy) of the original LUT;
breaking the original LUT into four quadrants around (Cx,Cy);
flipping the four quadrants such that each quadrant uses (Cx,Cy) as a lowest index;
generating a mean value of values at common index value for the four quadrants; and
storing the mean value at the index value of the QLUT in a memory of an image processing system.

18. The method of claim 17 further comprising:
generating the original LUT by mapping each corrected calibration image pixel to a corresponding pixel of the distorted calibration image.

19. The method of claim 17 wherein said determining the center point of the original LUT comprises:
determining a point of least error for radial and tangential distortion in the original LUT.

20. The method of claim 17 further comprising performing said method during a calibration of the image processing system, wherein the image processing system comprises a camera having an image sensor and a lens.

* * * * *